(12) United States Patent
Yasumura

(10) Patent No.: US 6,320,765 B2
(45) Date of Patent: Nov. 20, 2001

(54) SWITCHING POWER CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/778,289

(22) Filed: Feb. 7, 2001

(30) Foreign Application Priority Data

Feb. 9, 2000 (JP) ................................................ 12-038060

(51) Int. Cl.[7] ................................................ H02N 3/335
(52) U.S. Cl. .................... 363/21.02; 363/40; 363/56.12
(58) Field of Search .................... 363/16, 21.01, 363/21.02, 21.03, 39, 40, 41, 56.09, 56.12, 97

(56) References Cited

U.S. PATENT DOCUMENTS

| | | | |
|---|---|---|---|
| 5,267,133 | * | 11/1993 | Motomura et al. ............... 363/21.03 |
| 5,434,768 | * | 7/1995 | Jitaru et al. ....................... 363/21.01 |
| 5,959,438 | * | 9/1999 | Jovanovic et al. ............ 363/21.01 X |

* cited by examiner

*Primary Examiner*—Jessica Han
(74) *Attorney, Agent, or Firm*—Frommer Lawrence & Haug LLP; William S. Frommer

(57) ABSTRACT

An active clamp circuit is provided on the primary side of a composite resonance type switching converter which has a voltage resonant converter on its primary side and a parallel resonance circuit on its secondary side, wherein a parallel resonance voltage pulse generated across a primary parallel resonance capacitor is clamped so that the level thereof is suppressed. Consequently, the withstand voltage requisite relative to any of the component elements such as switching elements and the primary parallel resonance capacitor employed in the power circuit can be selectively lowered.

2 Claims, 10 Drawing Sheets

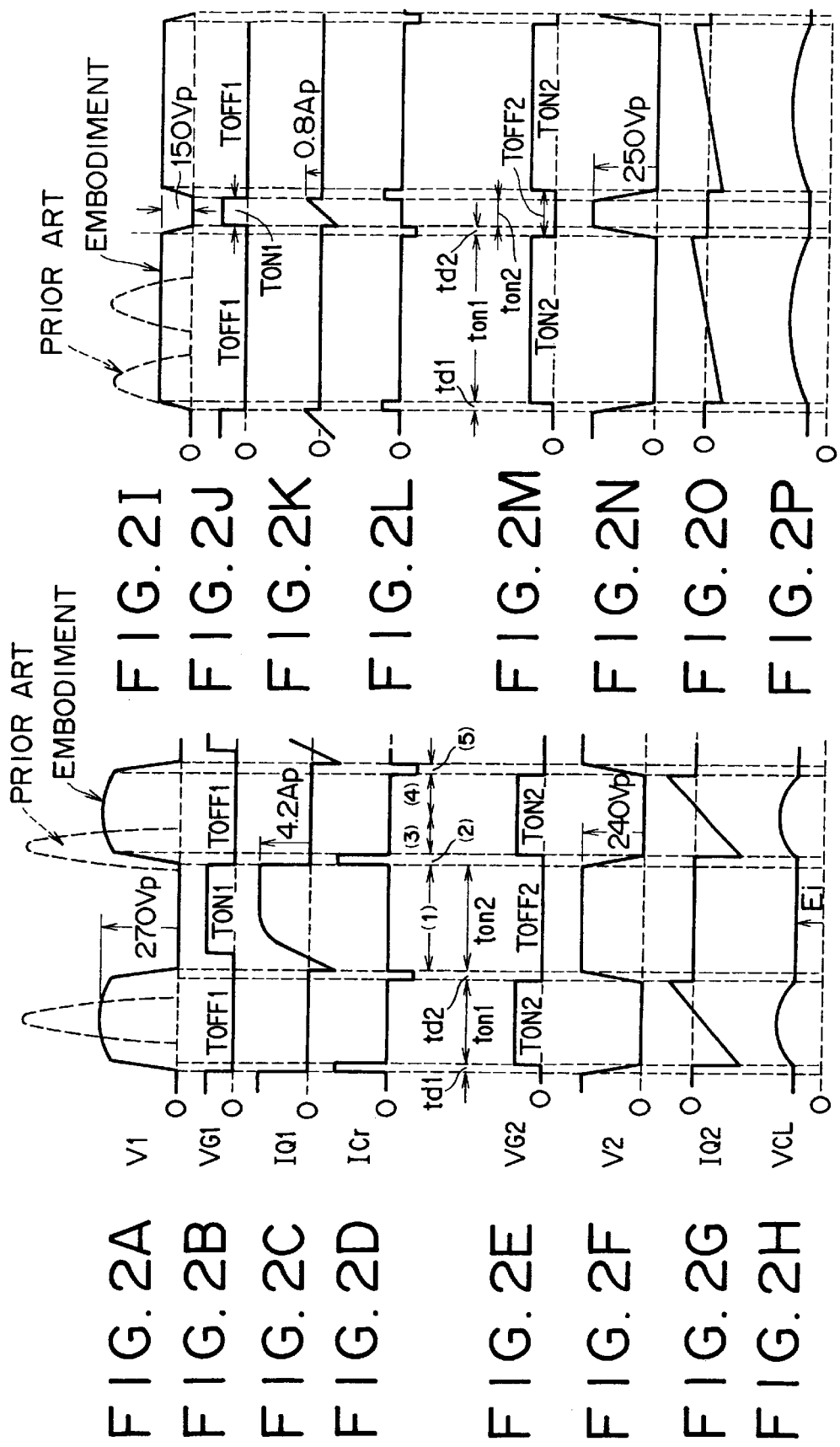

FIG. 8
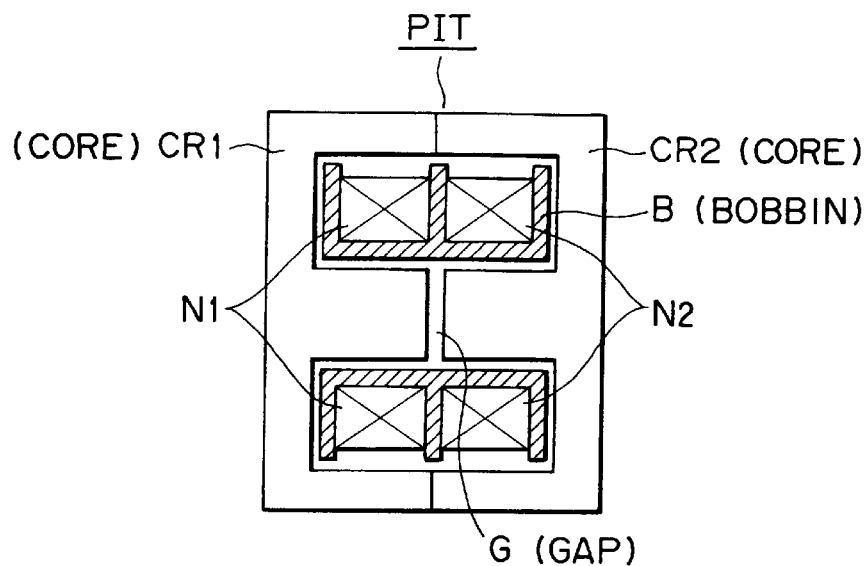
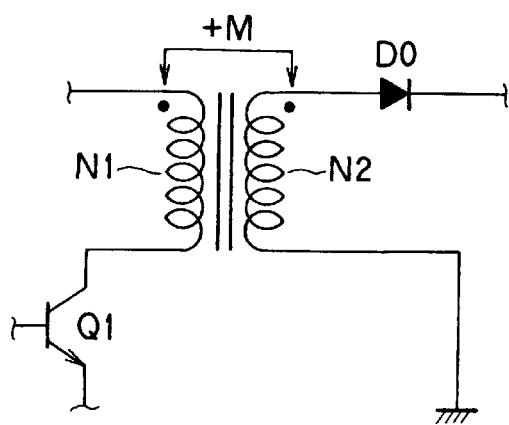
FIG. 9A
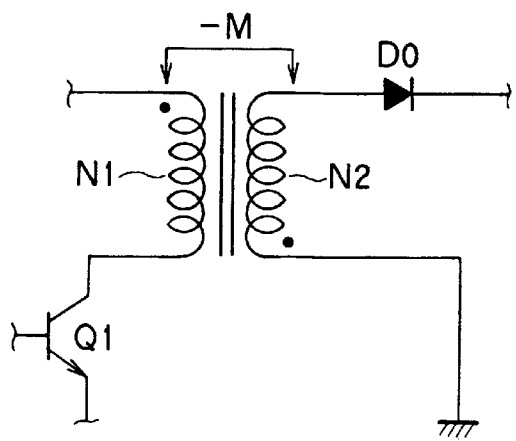
FIG. 9B

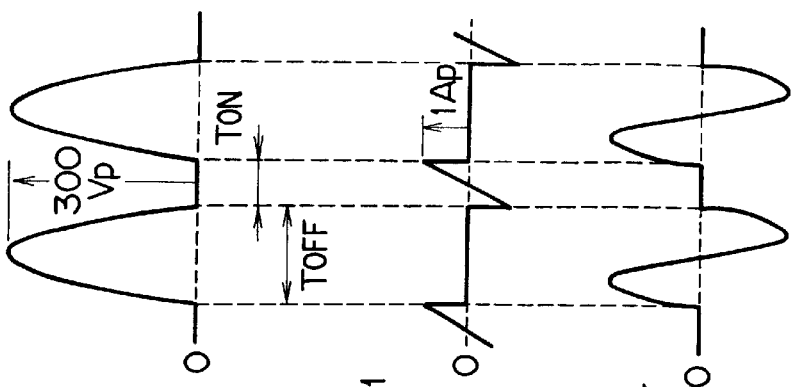
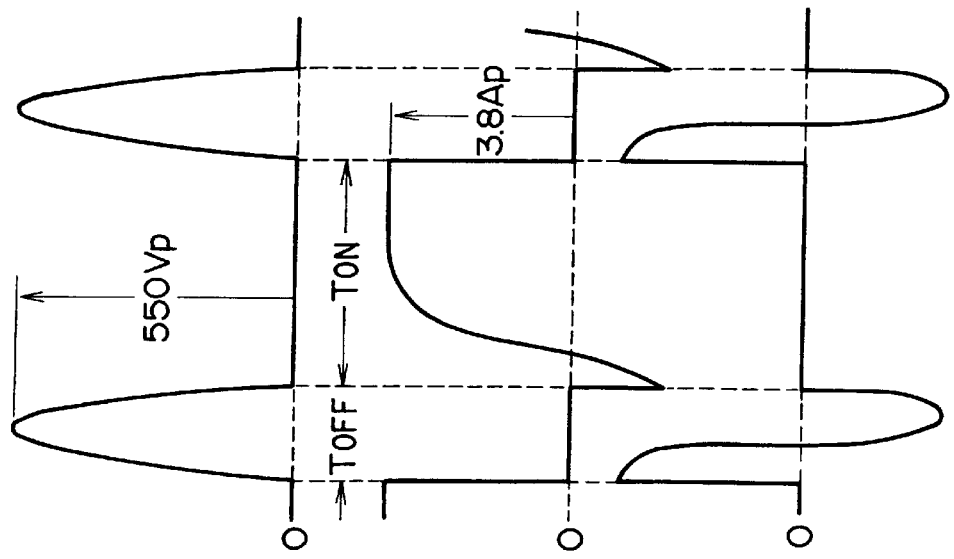

SWITCHING POWER CIRCUIT

BACKGROUND OF THE INVENTION

The present invention relates to a switching power circuit adapted for use as a power supply in various electronic apparatus.

There are widely known switching power circuits of a type employing a switching converter such as a flyback converter or a forward converter. Since such a switching converter performs its switching operation with rectangular waves, there exists a limit in suppression of switching noise. And it is also obvious that, due to the operating characteristic thereof, some restriction is unavoidable in improving the power conversion efficiency.

In view of the points mentioned above, a variety of switching power circuits employing various resonant converters have already been proposed by the present applicant. A resonant converter is capable of attaining a high power conversion efficiency with facility and realizing low noise as the switching operation is performed with sinusoidal waves. And it is further possible to achieve another merit that the circuit can be constituted of a relatively small number of component parts.

FIG. 6 is a circuit diagram showing a conventional switching power circuit of a configuration based on the known invention filed previously by the present applicant.

In the power circuit shown in this diagram, a full-wave rectifier circuit consisting of a bridge rectifier Di and a smoothing capacitor Ci is provided as a rectifier smoothing circuit for obtaining a DC input voltage from a commercial alternating power supply (alternating input voltage VAC), wherein a rectified smoothed voltage Ei corresponding to one-fold level of the alternating input voltage VAC is generated.

As a switching converter for intermittently turning on and off the input rectified smoothed voltage Ei (DC input voltage), there is provided a voltage resonant converter which comprises a switching element Q1 of one transistor to perform its switching operation in a single end form.

The voltage resonant converter employed here adopts a separately excited structure, and the switching element Q1 consists of a MOS-FET for example. The drain of this switching element Q1 is connected to the positive terminal of the smoothing capacitor Ci via a primary winding N1 of the insulating converter transformer PIT, and its source is connected to a primary-side ground.

A parallel resonance capacitor Cr is connected between the drain and source of the switching element Q1. The capacitance of this parallel resonance capacitor Cr and a leakage inductance obtained in the primary winding N1 of the insulating converter transformer PIT constitute a primary parallel resonance circuit. And a resonance action is caused by the parallel resonance circuit in accordance with the switching operation of the switching element Q1, so that such switching operation of the switching element Q1 becomes a voltage resonance type.

Further a clamp diode DD consisting of a body diode is connected in parallel between the drain and source of the switching element Q1, thereby forming a path of a clamp current which flows during the off-time of the switching element.

In this case, the drain of the switching element Q1 is connected to an oscillation circuit 41 in a switching driver 10B which will be described next. The drain output supplied to the oscillation circuit 41 is used for variably controlling the switching on-time in control of the switching frequency as will be mentioned later.

The switching element Q1 is driven by the switching driver 10B which is integrally equipped with the oscillation circuit 41 and a drive circuit 42, and the switching frequency is variably controlled for execution of constant voltage control. The switching driver 10B in this case is provided as a single integrated circuit (IC) for example.

The switching driver 10B is connected to the line of a rectified smoothed voltage Ei via a start resistor Rs, and at a power supply start time for example, a source voltage is impressed via the start resistor Rs to thereby start the switching driver 10B.

The oscillation circuit 41 in the switching driver 10B performs oscillation to thereby generate an oscillation signal and then outputs the same. Subsequently in the drive circuit 42, this oscillation signal is converted into a driving voltage and then is outputted to the gate of the switching element Q1. Thus, the switching element Q1 performs its switching operation based on the oscillation signal generated in the oscillation circuit 41. Therefore, the switching frequency of the switching element Q1 and the on/off duty ratio in one switching period are determined depending on the oscillation signal generated in the oscillation circuit 41.

The oscillation circuit 41 performs its operation of changing the oscillation signal frequency (switching frequency fs) on the basis of the level of a secondary DC output voltage EO which is supplied via a photo coupler 30 as will be mentioned later. And simultaneously with the operation of changing the switching frequency fs, the oscillation circuit 41 further serves to control the oscillation signal waveform in such a manner that the on-time TON (conduction angle) of the switching element Q1 is changed while the off-time TOFF of the switching element Q1 is maintained constant. Consequently, the secondary DC output voltage EO can be stabilized due to such operation of the oscillation circuit 41, as will be described later.

The insulating converter transformer PIT transmits the switching output of the switching element Q1 to the secondary side.

As shown in FIG. 8, the insulating converter transformer PIT has an EE-shaped core where E-shaped cores CR1 and CR2 composed of ferrite for example are combined with each other in such a manner that magnetic legs thereof are opposed mutually, and the primary winding N1 and the secondary winding N2 thereof are coiled in a split state respectively by the use of a split bobbin B with regard to the center magnetic leg of the EE-shaped core. And a gap G is formed to the center magnetic leg as shown in the diagram, whereby coarse coupling is attained with a required coupling coefficient.

The gap G can be formed by shaping the center magnetic leg of each of the E-shaped cores CR1 and CR2 to be shorter than the two outer magnetic legs thereof. The coupling coefficient k is set as, e.g., k≈0.85 suited to attain coarse coupling, hence avoiding a saturated state correspondingly thereto.

As shown in FIG. 6, the end of the primary winding N1 of the insulating converter transformer PIT is connected to the drain of the switching element Q1, while the beginning of the primary winding N1 is connected to the positive terminal (rectified smoothed voltage Ei) of the smoothing capacitor Ci. Therefore, when the switching output of the switching element Q1 is supplied to the primary winding N1, there is generated an alternating voltage of a period corresponding to the switching frequency.

On the secondary side of the insulating converter transformer PIT, an alternating voltage induced by the primary winding N1 is generated in the secondary winding N2. In this case, a secondary parallel resonance capacitor C2 is connected in parallel to the secondary winding N2, so that a parallel resonance circuit is formed by a combination of the leakage inductance L2 of the secondary winding N2 and the capacitance of the secondary parallel resonance capacitor C2. And the alternating voltage induced in the secondary winding N2 by this parallel resonance circuit is a resonance voltage, i.e., a voltage resonance action is caused on the secondary side.

More specifically, this power circuit has, on its primary side, a parallel resonance circuit for turning the the switching operation into a voltage resonance type, and also has, on its secondary side, another parallel resonance circuit for producing a voltage resonance action. In this specification, the switching converter of a configuration equipped with resonance circuits on its primary and secondary sides as mentioned above will be referred to as "composite resonant switching converter".

On the secondary side of the power circuit formed as described above, a rectifier smoothing circuit consisting of a bridge rectifier DBR and a smoothing capacitor CO is provided to obtain a secondary DC output voltage EO. That is, in this configuration, full-wave rectification is performed by the bridge rectifier DBR on the secondary side. In this case, as a resonance voltage is supplied from the secondary parallel resonance circuit, the bridge rectifier DBR generates a secondary DC output voltage EO which is substantially equal in level to the alternating voltage induced in the secondary winding N2.

In a state where the primary side and the secondary side are isolated from each other via a photo coupler 30 with respect to direct current, the secondary DC output voltage EO is inputted also to the oscillation circuit 41 in the primary switching driver 10B.

As for the secondary-side operation in the insulating converter transformer PIT, the mutual inductance M regarding the inductance L1 of the primary winding N1 and the inductance L2 of the secondary winding N2 becomes either +M or −M depending on the relation of the polarities (winding directions) of the primary winding N1 and the secondary winding N2 to the connection of the rectifying diodes DO (DO1, DO2), and also depending on the polarity change of the alternating voltage induced in the secondary winding N2.

For example, if the circuit is equivalent to one shown in FIG. 9A, the mutual inductance becomes +M. Meanwhile, if the circuit is equivalent to another shown in FIG. 9B, the mutual inductance becomes −M.

Applying the above to the secondary-side operation shown in FIG. 6, when the alternating voltage obtained in the secondary winding N2 is positive for example, it is supposed that the operation with the rectified current flowing in the bridge rectifier circuit DBR is performed in the +M (forward) mode. Meanwhile, when the alternating voltage obtained in the secondary winding N2 is negative contrary to the above, it is supposed that the operation with the rectified current flowing in the bridge rectifier diode DBR is performed in the −M (flyback) mode. Thus, every time the alternating voltage obtained in the secondary winding N2 is turned to be positive or negative, the operation mode is changed to +M or −M relative to the mutual inductance.

In this configuration, the power increased by the action of the primary parallel resonance circuit and the secondary parallel resonance circuit is supplied to the load, so that the power to be supplied to the load is also increased correspondingly thereto to consequently enhance the increase rate of the maximum load power.

Such correspondence to the load condition can be realized due to the improved situation where a saturated state is not reached readily because of the coarse coupling attained by a required coupling coefficient with the gap G formed in the insulating converter transformer PIT, as explained previously with reference to FIG. 8. For example, in case the gap G is not existent in the insulating converter transformer PIT, the operation will be abnormal with a high probability as the insulating converter transformer PIT is placed in its saturated state during the flyback, whereby proper execution of the aforementioned full-wave rectification is rendered considerably difficult.

The stabilizing operation in the circuit of FIG. 6 is performed in the following manner.

As mentioned, the secondary DC output voltage EO is supplied via the photo coupler 30 to the oscillation circuit 41 in the primary switching driver 10B. Subsequently in the oscillation circuit 41, the oscillation signal frequency is changed in accordance with the level change of the secondary DC output voltage EO thus supplied, and then the oscillation signal is outputted. Due to this operation that changes the switching frequency of the switching element Q1, the resonance impedances of the primary voltage resonant converter and the insulating converter transformer PIT are also changed to consequently change the energy transmitted to the secondary side of the insulating converter transformer PIT. As a result, the secondary DC output voltage EO is maintained constant under control at a required level, hence stabilizing the power supply.

In the power circuit shown in FIG. 6, as described already, the switching frequency is changed in the oscillation circuit 41 by variably controlling the on-time TON of the switching element Q1 while keeping the off-time TOFF thereof fixed. More specifically, in this power circuit, its constant voltage control action is executed in a manner to variably control the switching frequency to thereby achieve control of the resonance impedance to the switching output, and simultaneously another control action is executed with regard to the conduction angle control (PWM control) of the switching element in the switching period. Such composite control action is realized by a set of control circuitry. In this specification, such composite control is termed "composite control system".

FIG. 7 shows another conventional power circuit of a configuration based on the contents proposed previously by the present applicant. In this diagram, any component parts corresponding to those in FIG. 6 are denoted by the same reference numerals or symbols, and a repeated explanation thereof is omitted here.

On the primary side of the power circuit shown in FIG. 7, a self-excited structure is provided as a voltage resonant converter circuit where a single end operation is performed by a switching element Q1 of one transistor. In this case, a high withstand-voltage bipolar transistor (BJT: junction transistor) is employed as the switching element Q1.

The base of the switching element Q1 is connected to the positive side of a smoothing capacitor Ci (rectified smoothed voltage Ei) via a base current limiting resistor RB and a starting resistor RS, so that a base current at the start is obtained from a rectifier smoothing line. And a series resonance circuit for self-excited oscillation driving, which consists of a series connection circuit of a driving coil NB, a resonance capacitor CB and a base current limiting resistor RB, is connected between the base of the switching element Q1 and a primary-side ground.

A path of a clamp current flowing during the off-time of the switching element Q1 is formed by a clamp diode DD inserted between the base of the switching element Q1 and the negative terminal (primary-side ground) of the smoothing capacitor Ci. Meanwhile, the collector of the switching element Q1 is connected to one end of the primary winding N1 of an insulating converter transformer PIT, and the emitter thereof is grounded.

A parallel resonance capacitor Cr is connected in parallel between the collector and emitter of the switching element Q1. In this case also, the capacitance of the parallel resonance capacitor Cr itself and a leakage inductance L1 of the primary winding N1 of the insulating converter transformer PIT constitute a primary parallel resonance circuit of the voltage resonant converter.

An orthogonal control transformer PRT shown in this diagram is a saturable reactor where a resonance current detection coil ND, a driving coil NB and a control coil NC are wound. This orthogonal transformer PRT is provided for driving the switching element Q1 and also for executing constant voltage control.

In the structure of this orthogonal control transformer PRT, although not illustrated, two double U-shaped cores having four magnetic legs form a solid core where the ends of the respective magnetic legs are mutually joined. And a resonance current detection coil ND and a driving coil NB are wound around two predetermined magnetic legs of the solid core in the same direction, and further a control coil NC is wound orthogonally to the resonance current detection coil ND and the driving coil NB.

In this case, the resonance current detection coil ND of the orthogonal control transformer PRT is inserted in series between the positive terminal of the smoothing capacitor Ci and the primary winding N1 of the insulating converter transformer PIT, so that the switching output of the switching element Q1 is transmitted to the resonance current detection coil ND via the primary winding N1. In the orthogonal control transformer PRT, the switching output obtained in the resonance current detection coil ND is induced in the driving coil NB through transformer coupling, hence generating an alternating voltage as a driving voltage in the driving coil NB. This driving voltage is delivered as a driving current from the series resonance circuit (NB, CB), which constitutes a self-excited oscillation driving circuit, to the base of the switching element Q1 via the base current limiting resistor RB. Consequently, the switching element Q1 performs its switching operation at a switching frequency determined by the resonance frequency of the series resonance circuit.

The insulating converter transformer PIT included in the circuit of FIG. 7 is structurally the same as the one described previously with reference to FIG. 8, so that the primary side and the secondary side thereof are in a state of coarse coupling.

Also on the secondary side of this insulating converter transformer PIT in the circuit of FIG. 7, a secondary parallel resonance capacitor C2 is connected in parallel to the secondary winding N2 to thereby constitute a secondary parallel resonance circuit, so that the configuration of a composite resonant switching converter is attained in this power circuit as well.

On the secondary side of this power circuit, a half-wave rectifier circuit consisting of a single diode DO and a smoothing capacitor CO is provided to the secondary winding N2, wherein a secondary DC output voltage EO is obtained by half-wave rectification in its forward operation alone. In this case, the secondary DC output voltage EO is branched and inputted also to a control circuit 1, wherein the DC output voltage EO is used as a detection voltage.

In the control circuit 1, the level of a control current (direct current) flowing in a control coil NC is changed in accordance with a change of the secondary DC output voltage level EO, thereby variably controlling the inductance LB of the driving coil NB wound around the orthogonal control transformer PRT. Consequently, the resonance condition of the series resonance circuit is changed in a self-excited oscillation driving circuit formed inclusively of the inductance LB of the driving coil NB for the switching element Q1. The above is an operation for changing the switching frequency of the switching element Q1 to thereby stabilize the secondary DC output voltage. In such constant voltage control configuration equipped with the orthogonal control transformer PRT, the primary switching converter is formed into a voltage resonant type, whereby there is achieved a composite control action which executes variable control of the switching frequency and, simultaneously therewith, conduction angle control (PWM control) of the switching element in the switching period.

FIGS. 10A through 10F are waveform charts showing the operation of the primary voltage resonant converter in the power circuits of FIGS. 6 and 7. FIGS. 10A through 10C represent the operation performed under the conditions of AC input voltage VAC=100V and maximum load power Pomax =200 W; and FIGS. 10D through 10F represent the operation performed under the conditions of AC input voltage VAC=100V and minimum load power Pomin=0 W.

In response to a switching operation of the switching element Q1, a resonance action of the primary parallel resonance circuit is produced during the off-time TOFF of the switching element Q1. Consequently, a parallel resonance voltage V1 obtained across the parallel resonance capacitor Cr is such as shown in FIGS. 10A and 10D where a sine-wave resonance pulse is generated during the time TOFF.

Since such a parallel resonance action is produced during the time TOFF, a parallel resonance current Icr flowing in the parallel resonance capacitor Cr becomes such as shown in FIGS. 10C and 10F where the current of a substantially sinusoidal wave flows with a transition from a positive direction to a negative direction during the time TOFF.

As obvious from comparison of FIG. 10A with FIG. 10D, the switching frequency fs is so controlled as to become higher with a decrease of the load power Po, and the switching frequency fs (switching period) is varied by changing the on-time TON of the switching element Q1 while keeping the off-time TOFF thereof fixed. That is, the operation conforming with the aforementioned composite control system is represented in the diagrams.

In the configuration of the voltage resonant converter shown in FIGS. 6 and 7, the level of the parallel resonance voltage V1 changes in accordance with a variation of the load power. For example, it becomes 550 Vp when the maximum load power Pomax=200 W, or 300 Vp when the minimum load power Pomin=0 W. That is, the parallel resonance voltage V1 tends to rise with an increase of the load power.

As shown in FIGS. 10B and 10E, the switching output current IQ1 flowing in the drain or collector of the switching element Q1 flows with a zero level during the time TOFF or flows with the shown waveform during the time TON. The level of this switching output current IQ1 also tends to rise with an increase of the load power Po. According to these diagrams for example, it becomes 3.8 A when the maximum load power Pomax=200 W, or 1A when the minimum load power Pomin=0 W.

Regarding the characteristics of the power circuits shown in FIGS. 6 and 7, FIG. 11 represents variation characteristics of the switching frequency fs, the times TOFF and TON within one switching period, and the parallel resonance voltage V1 to the AC input voltage VAC when the maximum load power Pomax=200 W.

As shown graphically in FIG. 11, first the switching frequency fs is changed approximately in a range of fs=110 kHz to 140 kHz with respect to a variation range of the AC input voltage VAC=90V to 140V. This graph indicates that any variation of the secondary DC output voltage EO is stabilized in accordance with a variation of the DC input voltage. Upon variation of the AC input voltage VAC, the switching frequency is raised under control in accordance with a rise of the AC input voltage VAC.

As for the times TOFF and TON in one switching period, the time TOFF is kept fixed regardless of the switching frequency fs, while the time TON is lowered on a quadratic curve in accordance with a rise of the switching frequency fs. Thus, the graph also indicates that the switching frequency control is executed in conformity with the composite control system.

Meanwhile the parallel resonance voltage V1 is changed in accordance with a variation of the commercial AC power VAC and, as shown graphically, its level is varied to be higher with a rise of the AC input voltage VAC.

As shown in FIGS. 6 and 7 for example, in the power circuit so constituted as to stabilize the secondary DC output voltage by the composite control system, the peak level of the parallel resonance voltage V1 changes in accordance with load conditions and variations of the AC input voltage VAC, as shown in FIGS. 10A, 10B and 11 also. Particularly when the level of the AC input voltage VAC obtained from, e.g., a 100V commercial AC power supply has reached 140V in a heavy load state close to the maximum load power, then the parallel resonance voltage V1 rises maximally to 700 Vp, as shown in FIG. 11.

Therefore, with regard to the parallel resonance capacitor Cr and the switching element Q1 to which the parallel resonance voltage V1 is applied, these component parts need to meet a withstand voltage requisite of 800V when used with a 100V commercial AC power supply, or to meet a withstand voltage requisite of 1200V when used with a 200V commercial AC power supply. Consequently, it is unavoidable that both the parallel resonance capacitor Cr and the switching element Q1 become larger in size, and the cost is rendered higher as well.

The switching element has such a feature that its characteristic is deteriorated with a structural alteration to attain a higher voltage withstand performance. For this reason, if the switching element Q1 is so selected as to meet a higher withstand voltage requisite, its power loss resulting from the switching operation is increased to consequently bring about deterioration of the power conversion efficiency.

In the case of adopting a configuration to stabilize the secondary DC output voltage by the composite control system, if there occurs a fault that the secondary load is shorted, the controller functions to lower the switching frequency. In a state where the switching frequency becomes lower, as obvious from the waveform charts of FIGS. 10A through 10F, the on-time TON of the switching element is rendered longer to eventually raise the voltage (V1) applied to the switching element Q1 and the parallel resonance capacitor Cr and also to increase the currents (IQ1, Icr) flowing therein.

Accordingly, it becomes necessary to prepare, as a countermeasure against occurrence of a load shorted fault, an overcurrent protection circuit and an overvoltage protection circuit for protecting the switching element by limiting any high-level voltage and current generated in such a fault. And the existence of such overcurrent and overvoltage protection circuits further impedes improvement in down-sizing and cost reduction of the entire circuits.

SUMMARY OF THE INVENTION

In view of the problems mentioned above, it is an object of the present invention to provide a switching power circuit which is capable of enhancing power conversion efficiency and realizing dimensional and weight reduction.

To achieve the above object, according to a first aspect of the present invention, there is provided a switching power circuit having the following configuration.

That is, the switching power circuit includes switching means having a main switching element for intermittently outputting a DC input voltage supplied thereto; a primary parallel resonance capacitor so provided as to constitute a primary parallel resonance circuit which turns the operation of the switching means into a voltage resonance type; an insulating converter transformer where a gap is formed in such a manner as to obtain a required coupling coefficient to acquire coarse coupling with regard to the primary and secondary sides, and the output of the switching means obtained on the primary side is transmitted to the secondary side; a secondary parallel resonance circuit formed by connecting a secondary parallel resonance capacitor in parallel to a secondary winding of the insulating converter transformer; and DC output voltage generating means so formed as to generate a secondary DC output voltage by inputting and rectifying an alternating voltage obtained from the secondary winding of the insulating converter transformer.

The switching power circuit further includes switching drive means for driving the main switching element to execute constant voltage control thereof by changing the on/off duty ratio in each switching period at a predetermined constant switching frequency in accordance with the level of the secondary DC output voltage; and active clamp means having an auxiliary switching element to perform a switching operation in such a manner as to obtain predetermined on/off times changeable in accordance with the on/off times of the main switching element, thereby clamping the primary parallel resonance voltage generated across the primary parallel resonance capacitor during the off-time of the main switching element.

According to the above configuration, a primary parallel resonance circuit is provided on the primary side to constitute a voltage resonant converter, while a secondary parallel resonance circuit consisting of a secondary winding and a secondary parallel resonance capacitor is provided on the secondary side, hence constituting a composite resonant switching converter.

On the basis of such configuration, constant voltage control is executed by changing the on/off duty ratio under control while keeping the switching frequency fixed.

And due to the active clamp means provided on the primary side for clamping the parallel resonance voltage generated during the off-time of the main switching element, the parallel resonance voltage level can be suppressed.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 2A through 2P show waveform charts of operations performed under maximum and minimum load power conditions in the embodiment of the switching power circuit;

FIG. 8 is a sectional view showing a structural example of an insulating converter transformer;

FIGS. 9A and 9B are equivalent circuit diagrams showing the operations performed when a mutual inductance is +M and −M, respectively;

FIGS. 10A through 10F show waveform charts of operations performed in the switching power circuits of FIGS. 6 and 7.

PREFERRED EMBODIMENTS OF THE INVENTION

Figure 1:
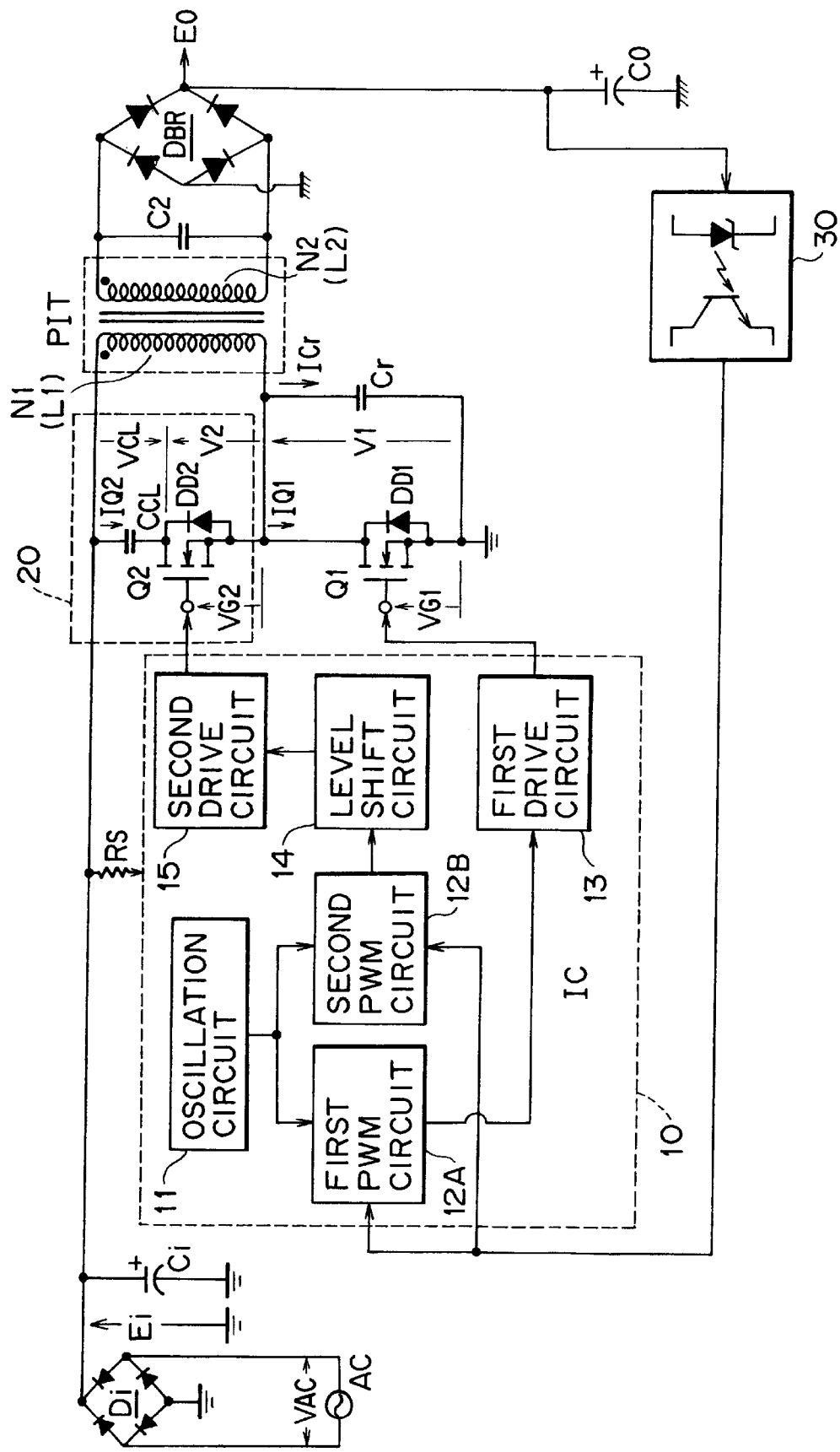
FIG. 1 is a circuit diagram showing an exemplary configuration of an embodiment which represents the switching power circuit of the present invention.
Figure 6:
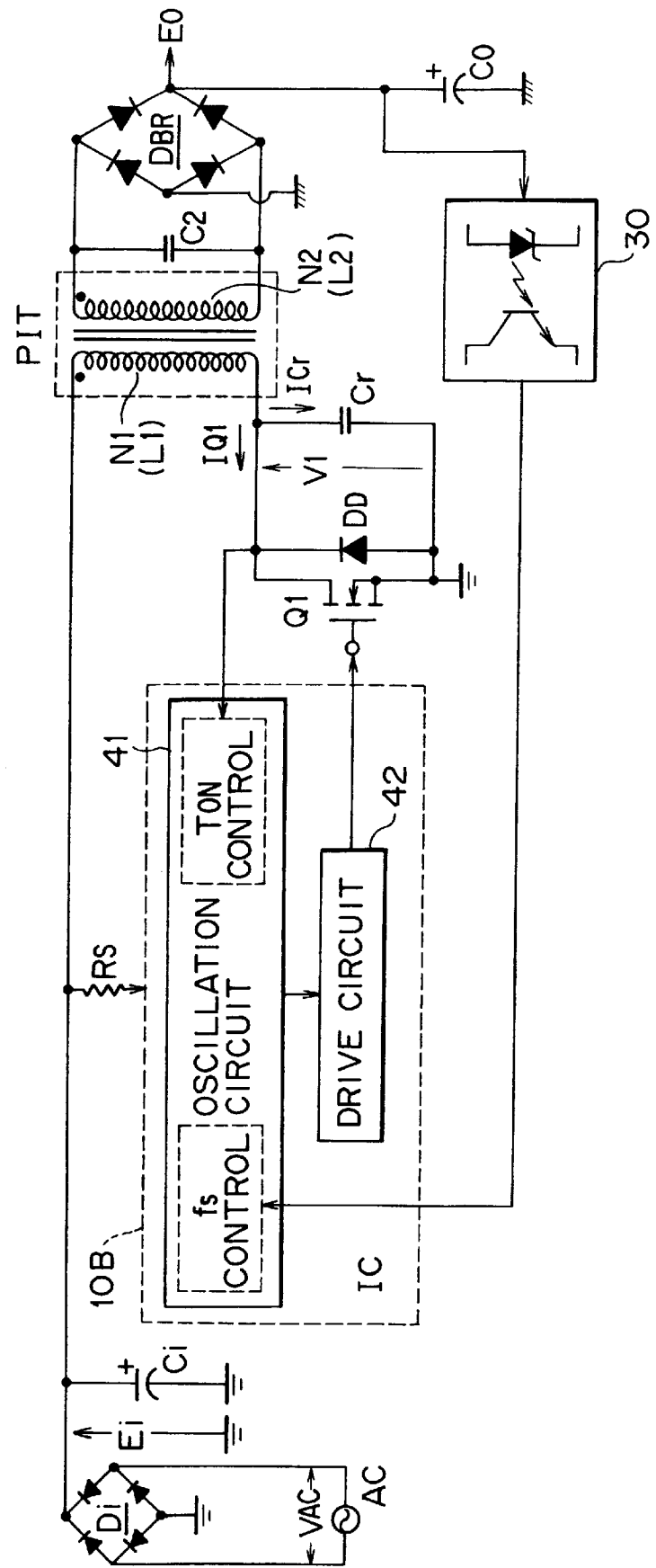
FIG. 6 is a circuit diagram showing an exemplary configuration of a conventional switching power circuit according to the prior art.
Figure 7:
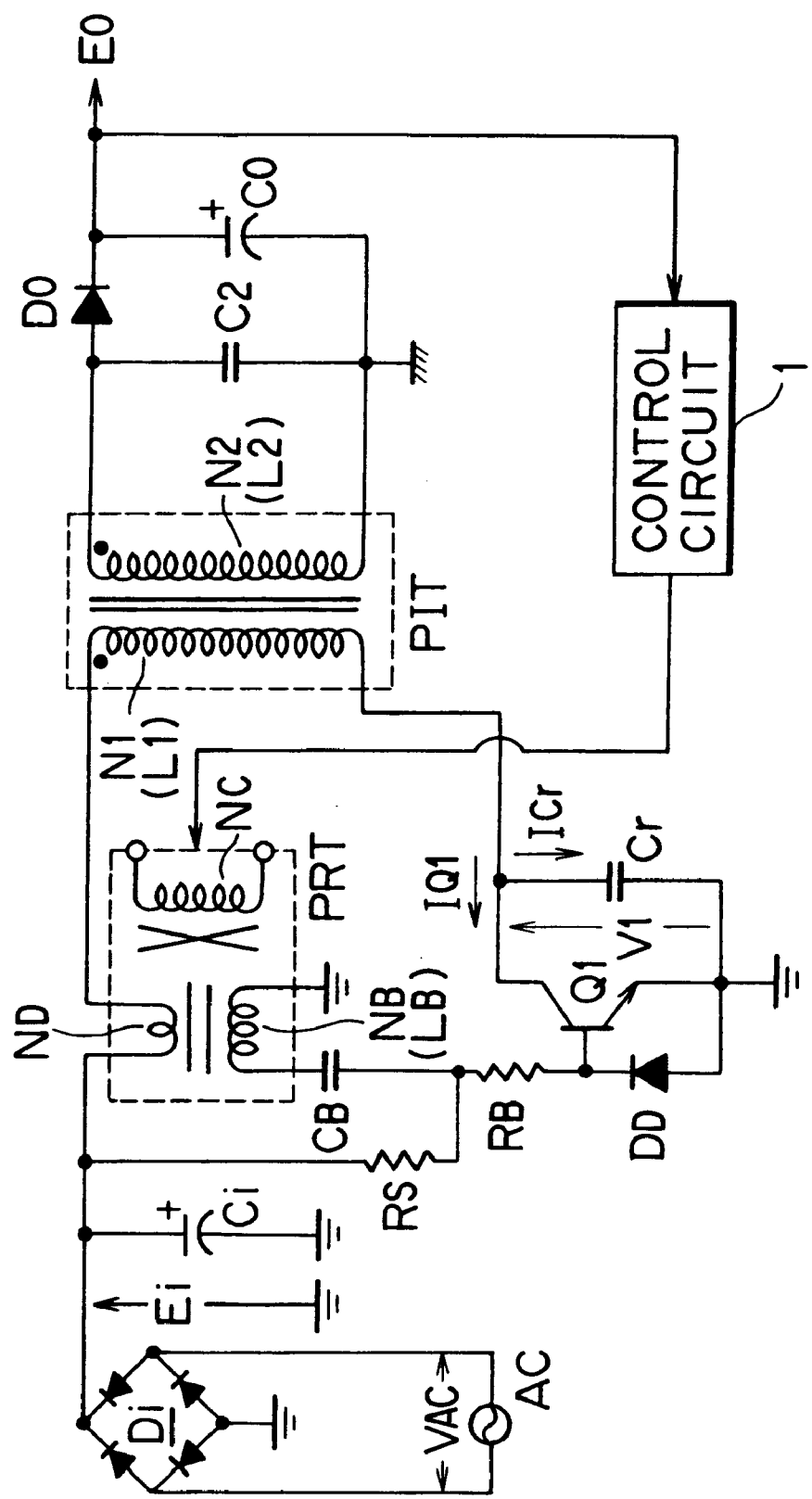
FIG. 7 is a circuit diagram showing an exemplary configuration of another conventional switching power circuit according to the prior art.
Figure 11:
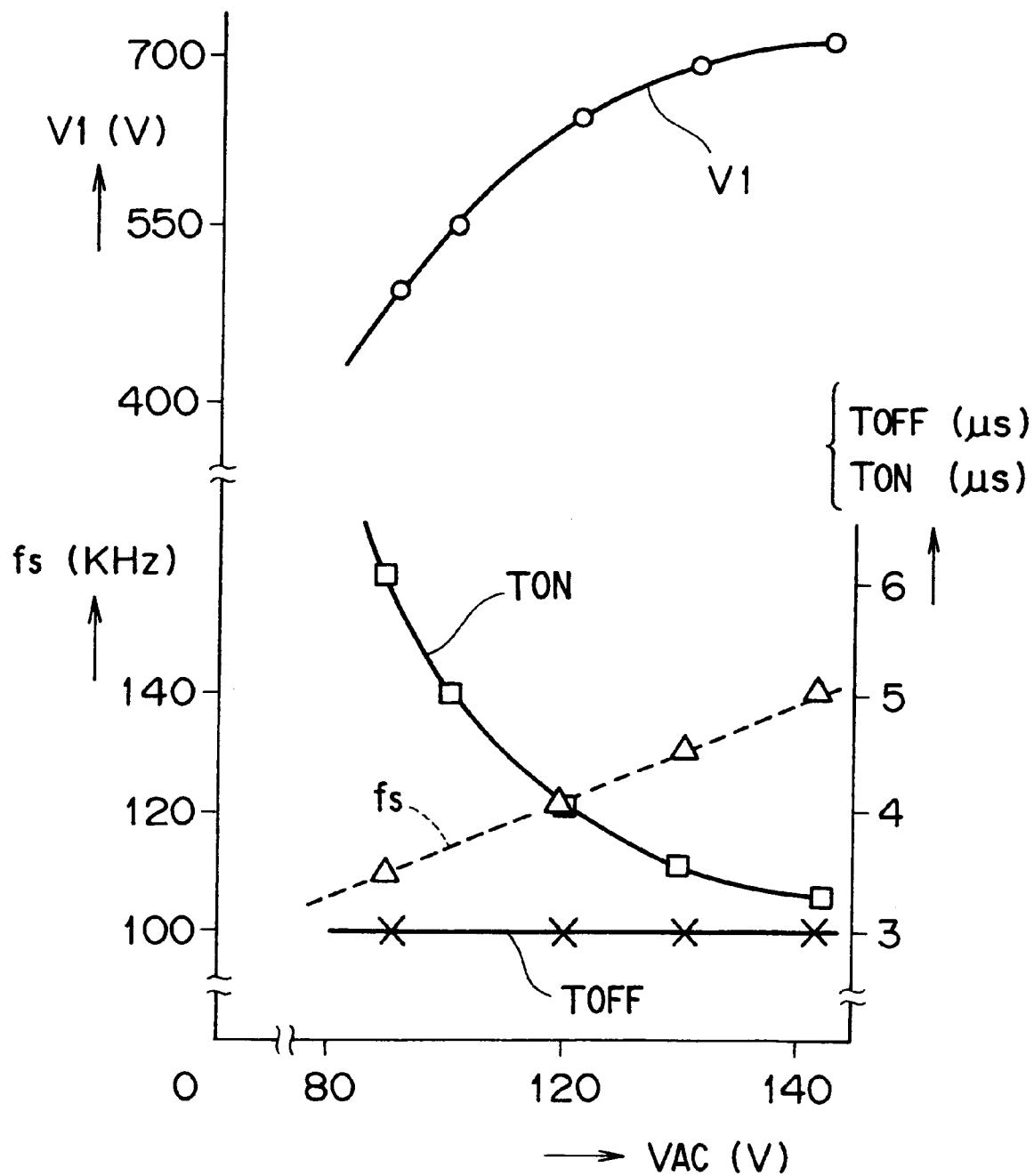
FIG. 11 is an explanatory diagram graphically showing the characteristics of the switching power circuits of FIGS. 6 and 7 to an AC input voltage.

FIG. 1 shows an exemplary configuration of a preferred embodiment representing the switching power circuit of the present invention. In this diagram, any component parts corresponding to those shown in FIGS. 6 and 7 are denoted by the same reference numerals or symbols, and a repeated explanation thereof is omitted here. The power circuit shown in FIG. 1 also adopts a construction to serve as a composite resonant switching converter, which is therefore equipped with an insulating converter transformer PIT of the aforementioned structure shown in FIG. 8. It is to be understood that this construction is the same in any of the power circuits represented by other preferred embodiments which will be described later.

In the primary-side configuration of the power circuit shown in FIG. 1, there is provided a separately excited voltage resonant converter which is equipped with a main switching element Q1 and performs its switching operation fundamentally in a single end form. In addition thereto, an active clamp circuit 20 is provided for clamping a parallel resonance voltage V1 obtained across a parallel resonance capacitor Cr, as will be described later. This active clamp circuit 20 is equipped with an auxiliary switching element Q2.

And a switching driver 10 is provided for driving the main switching element Q1 and the auxiliary switching element Q2 individually.

In this case, a MOS-FET is used as each of the main switching element Q1 and the auxiliary switching element Q2.

Also in this case, the active clamp circuit 20 is constituted of the auxiliary switching element Q2, a clamp capacitor CCL and a clamp diode DD2.

The clamp diode DD2 is connected in parallel between the drain and source of the auxiliary switching element Q2. In this example, the anode of the clamp diode DD2 is connected to the source, while the cathode thereof is connected to the drain.

The drain of the auxiliary switching element Q2 is connected to one terminal of the clamp capacitor CCL, while the other terminal thereof is connected to a junction of the line of a rectified smoothed voltage Ei and the beginning of the primary winding N1. Further the source of the auxiliary switching element Q2 is connected to the end of the primary winding N1.

More specifically, in the active clamp circuit 20 in this embodiment, the clamp capacitor CCL is connected in series to a parallel connection circuit consisting of the auxiliary switching element Q2 and the clamp diode DD2. And the circuit thus formed is connected in parallel to the primary winding N1 of the insulating converter transformer PIT to thereby constitute the active clamp circuit 20.

The switching driver 10 in this embodiment comprises, as shown in the diagram, an oscillation circuit 11, a first PWM control circuit 12A, a second PWM control circuit 12B, a first drive circuit 13, a level shift circuit 14 and a second drive circuit 15.

The oscillation circuit 11 in this case generates a fixed-frequency oscillation signal of, e.g., 100 kHz, and then branches and outputs the oscillation signal to the first PWM control circuit 12A and the second PWM control circuit 12B.

The first PWM control circuit 12A and the second PWM control circuit 12B are provided in relation to the switching elements Q1 and Q2 respectively, where the oscillation signal generated in the oscillation circuit 11 is inputted, and simultaneously a secondary DC output voltage EO is also supplied as a control input via a photo coupler 30.

Thereafter in the first PWM control circuit 12A and the second PWM control circuit 12B, PWM control is executed with regard to the oscillation signal inputted from the oscillation circuit 11, in accordance with the level of the secondary DC output voltage EO supplied as a control input. More specifically, the control is executed to change the waveform duty in one period corresponding to 100 kHz. This waveform duty determines the on-time and off-time in the switching period.

The main switching element Q1 and the auxiliary switching element Q2 perform the respective switching operations at the same switching frequency synchronously with each other as will be mentioned later, but are mutually different in on/off timing within each switching period.

Therefore, the first PWM control circuit 12A is so formed as to execute PWM control for setting the on-time and off-time in the switching period relative to the main switching element Q1, while the second PWM control circuit 12B is so formed as to execute PWM control for setting the on-time and off-time relative to the auxiliary switching element Q2.

The output signal from the first PWM control circuit 12A is supplied to a first drive circuit 13. Subsequently in the first drive circuit 13, the signal obtained from the first PWM control circuit 12A is converted into a voltage signal to thereby generate a switching drive signal for driving the main switching element Q1 which consists of a MOS-FET, and this drive signal is impressed to a gate terminal of the main switching element Q1. Then the main switching element Q1 performs its switching operation in accordance with such a switching drive signal.

Meanwhile the output signal from the second PWM control circuit 12B is supplied to a level shift circuit 14. Subsequently in the level shift circuit 14, a predetermined level shift process is executed with regard to the input signal to finally produce a signal of the waveform corresponding to the on/off timing of the auxiliary switching element Q2. And this signal is supplied to a second drive circuit 15.

Thereafter in the second drive circuit 15, the input signal is converted into a voltage to thereby generate a switching drive signal for driving the auxiliary switching element Q2, and this drive signal is impressed to a gate terminal of the auxiliary switching element Q2 which consists of a MOS-FET. Thus, the auxiliary switching element Q2 is driven to perform its switching operation at the required on/off timing.

It is supposed here that the switching driver 10 in the embodiment of the above configuration is constituted of a single IC.

Waveform charts of FIGS. 2A through 2P principally represent the primary-side switching operation performed in the circuit of FIG. 1, i.e., the operation of the voltage resonant converter equipped with the active clamp circuit 20.

The operation shown in FIGS. 2A through 2P is obtained in a configuration adapted for an AC 100V line with regard to the circuit of FIG. 1. FIGS. 2A through 2H represent the operations of individual component parts under conditions of an AC input voltage VAC=100V and a maximum load power Pomax=200 W; and FIGS. 2I through 2P represent the operations of the same component parts as those shown in FIGS. 2A through 2H under conditions of an AC input voltage VAC=100V and a minimum load power Pomin=0 W.

Now an explanation will be given on the primary switching operation in this embodiment with reference to the waveforms of FIGS. 2A through 2H obtained when the AC input voltage VAC=100V and the maximum load power Pomax=200 W.

In these waveform charts, the switching drive signals impressed to the respective gates of the main switching element Q1 and the auxiliary switching element Q2 correspond to gate voltages VG1 and VG2 shown respectively in FIGS. 2B and 2E. When the maximum load power Pomax=200 W, the on/off times of the gate voltages VG1 and VG2 are so set as shown in FIGS. 2B and 2E respectively.

For example, in the first PWM control circuit 12A, PWM control is so executed as to achieve an operation where the on-time TON1 of the gate voltage VG1 shown in FIG. 2B is changed continuously in accordance with the level of the secondary DC output voltage EO. Meanwhile, in a line from the second PWM control circuit 12B to the level shift circuit 14, PWM control is so executed as to achieve an operation where the on-time TON2 of the gate voltage VG2 shown in FIG. 2E is changed continuously in accordance with the level of the secondary DC output voltage EO.

In FIGS. 2A through 2P, five stages of operation modes from (1) to (5) are shown with respect to the operation modes in one switching period.

Control of the main switching element Q1 for turning it on by the gate voltage VG1 is executed during a time ton2 corresponding to a flow of the switching output current IQ1 shown in FIG. 2C. And during the time ton2, the operation is performed in mode (1). Meanwhile, during such time ton2, the auxiliary switching element Q2 is so controlled as to be in its off-state by the gate voltage VG2 of a zero level.

In mode (1) (time ton2), there is performed an operation where the switching output current IQ1 flows via the leakage inductance L1 obtained in the primary winding N1 of the insulating converter transformer PIT. The switching output current IQ1 in this case has a waveform inverted from a negative direction to a positive direction, as shown in time ton2 of FIG. 2C. During the negative-direction flow of the switching output current IQ1, the clamp diode DD1 is turned on to conduct since the discharge in the parallel resonance capacitor Cr terminates at the end of the preceding time td2, thereby causing a flow of the switching output current IQ1 via the clamp diode DD1→primary winding N1, so that the mode becomes such as to regenerate the power toward the power supply side.

And at the timing of inverting the switching output current IQ1 (FIG. 2C) from a negative direction to a positive direction, the gate voltage VG1 shown in FIG. 2B is so controlled as to rise to a high (H) level, whereby the main switching element Q1 is turned on at this timing by ZVS (Zero Volt Switching) and ZCS (Zero Current Switching).

And during the next time td1, the operation is performed in mode (2).

The main switching element Q1 is turned off during this time, so that the current flowing in the primary winding N1 is caused to flow in the parallel resonance capacitor Cr. Consequently, the current Icr of FIG. 2D presents the shown waveform where a positive pulse appears, and this indicates an operation in a partial resonance mode. Since the parallel resonance capacitor Cr is connected in parallel to the main switching element Q1 at this time, the main switching element Q1 is turned off by ZVS.

Subsequently, a control action is so executed as to turn on the auxiliary switching element Q2 while turning off the main switching element Q1. This operation corresponds to a time TON2 of FIG. 2E where the gate voltage VG2 is turned to a high (H) level.

During this time TON2, the active clamp circuit is placed in an operating state, and its operation is performed first in mode (3) and then in mode (4).

In the operation of mode (2), the parallel resonance capacitor Cr is charged by the current Icr flowing from the primary winding N1. And in mode (3), the voltage obtained in the primary winding N1 becomes potentially equal to or higher than the initial level (at start of time TON2) of the voltage VCL obtained across the clamp capacitor CCL as shown in FIG. 2H. Thus, the condition for conduction of the clamp diode DD2, which is connected in parallel to the auxiliary switching element Q2, is satisfied to thereby cause conduction of the clamp diode DD2, so that a clamp current comes to flow by way of the clamp diode DD2→clamp capacitor CCL. The clamp current IQ2 has such a sawtooth waveform that, subsequently to start of the time TON2 shown in FIG. 2G, the level approaches its zero from a negative direction with a lapse of time.

The capacitance of the clamp capacitor CCL is so selected as to be more than 25 times the capacitance of the parallel resonance capacitor Cr. Therefore, depending on the operation of mode (3), most of the current flows as a clamp current IQ2 in the clamp capacitor CCL while nearly no current flows in the parallel resonance capacitor Cr, whereby the parallel resonance voltage V1 applied to the main switching element Q1 during the time TON2 is rendered gentle in inclination to be consequently suppressed to 270 Vp as shown in FIG. 2A, so that the conduction angle is widened. That is, an operation of clamping the parallel resonance voltage V1 is performed. In contrast therewith, the parallel resonance voltage V1 obtained in the conventional circuits (FIGS. 6 and 7) of the prior art denoted by a broken line in FIG. 2A has a pulse waveform having a level of 550 Vp.

In the time TON2, the operation proceeds to mode (4) upon completion of mode (3).

Mode mode (4) starts synchronously with an inversion of the clamp current IQ2, which is shown in FIG. 2G, from a negative direction to a positive direction. At this timing, the high-level gate voltage VG2 is outputted as shown in FIG. 2E, so that the auxiliary switching element Q2 is turned on by ZVS and ZCS synchronously with an inversion of the clamp current IQ2 from a negative direction to a positive direction.

When the auxiliary switching element Q2 has thus been turned to its on-state, the positive-going clamp current IQ2 flows, as shown in FIG. 2G, in the auxiliary switching element Q2 by way of the primary winding N1→clamp capacitor CCL due to the resonance action of the primary parallel resonance circuit executed during the on-time of the auxiliary switching element Q2.

The operation in mode (4) mentioned above terminates synchronously with a fall of the high-level gate voltage VG2 during the time TON2 to its low level, and then the operation proceeds to mode (5) corresponding to the time td2.

In mode (5), the parallel resonance capacitor Cr is discharged to cause a flow of current Icr in the primary winding N1. That is, a partial resonance action is executed. The parallel resonance voltage V1 applied to the main switching element Q1 at this time has a steep inclination as the capacitance of the parallel resonance capacitor Cr is small as described above, so that the voltage V1 falls sharply toward its zero level as shown in FIG. 2A.

Then the auxiliary switching element Q2 begins to be turned off synchronously with start of mode (5) subsequent to completion of mode (4). In this case, since the parallel resonance voltage V1 falls with a certain inclination as mentioned, the auxiliary switching element Q2 is turned off by ZVS.

The voltage generated due to turn-off of the auxiliary switching element Q2 is not raised steeply since the parallel resonance capacitor Cr is discharged as described above. This operation is represented by, e.g., the waveform of FIG. 2F which shows the switching output voltage V2 changed from a zero level to its peak level with a certain inclination during the time td2 (in mode (5)).

The switching output voltage V2 has a value of 240 Vp during the off-time TOFF2 of the auxiliary switching element Q2, and is changed from 240 Vp to its zero level during the time td1 (in mode (2)) corresponding to a start of the off-time TOFF2. And, as described, the voltage V2 is further changed from a zero level to its peak level 240 Vp during the time td2 (in mode (5)) corresponding to an end of the time TOFF2.

And subsequently, the operations of modes (1) to (5) are performed repeatedly in each switching period.

FIGS. 2I through 2P represent the operations performed under conditions of AC input voltage VAC=100V and minimum load power Pomin=0 W with regard to the waveforms of FIGS. 2A through 2H. As the operations are the same as those in modes (1)–(5), the parallel resonance voltage V1 in this embodiment can be suppressed to 150 Vp as shown in FIG. 2I, whereas it becomes 300 Vp in the conventional power circuits of FIGS. 6 and 7 according to the prior art.

In this embodiment, as obvious from comparison of the gate voltages VG1 and VG2 shown in FIGS. 2B and 2E with the gate voltages VG1 and VG2 shown in FIGS. 2J and 2M, the high-level waveform portions during the on-times TON1 and TON2 for respectively driving the main switching element Q1 and the auxiliary switching element Q2 are controlled variably while the switching frequency fs thereof is maintained at a fixed value of 100 kHz for example.

In accordance with transition from a heavy load state to a light load state, the main switching element Q1 is so controlled that the the on-time TON1 is rendered shorter to increase the off-time, while the auxiliary switching element Q2 is so controlled that, inversely thereto, the on-time TON2 is rendered longer to increase the on-time.

For example, in regard of the main switching element Q1, PWM control is so executed as to obtain a duty ratio expressed as $$TON1/(TON1+TOFF1)=0.5-1$$

Meanwhile in regard to the auxiliary switching element Q2, PWM control is so executed as to obtain a duty ratio expressed as $$TON2/(TON2+TOFF2)=0.5-1$$

As manifest from the description given above with reference to FIGS. 2A through 2P, the parallel resonance voltage V1 generated during the off-time of the main switching element Q1 is clamped in the circuit of FIG. 1, and the level thereof is suppressed. And even if the supply voltage in an AC 100V line is raised as VAC=144V or so under the maximum load condition for example, the parallel resonance voltage V1 can be suppressed to less than 400V. Also in an AC 200V line, the peak level of the parallel resonance voltage V1 can be suppressed to less than 800V. Therefore, in the circuit of FIG. 1, the main switching element Q1 needs to meet merely a withstand voltage requisite of 400V for an AC 100V line, or to meet merely a withstand voltage requisite of 800V for an AC 200V line. That is, the withstand voltage requisite can be lowered in comparison with the conventional circuits of FIGS. 6 and 7. As for the auxiliary switching element Q2 also, it is possible to selectively employ one that meets merely a lower withstand voltage requisite.

As a result, the characteristics of the switching elements in the circuit of FIG. 1 can be improved as compared with those in the circuit of FIGS. 6 and 7. For example, when the switching element consists of a MOS-FET, its on-resistance is reduced to consequently enhance the power conversion efficiency. Practically, for example, the power conversion efficiency in the circuits of FIGS. 6 and 7 is 92%, whereas such efficiency is improved to be 93% in the circuit of FIG. 1, hence diminishing the power loss approximately by 2.3 W.

Since it is possible to selectively employ a switching element of a lower withstand voltage requisite, the switching element itself can be down-sized. For example, the switching element used in the circuits of FIGS. 6 and 7 needs to meet a withstand voltage requisite of more than 1000V, so that the package thereof becomes relatively large in size. However, each of the switching elements Q1 and Q2 used in the circuit of FIG. 1 can be shaped into a smaller package.

As the level of the parallel resonance voltage V1 can be suppressed, the parallel resonance capacitor Cr employed in the circuit of FIG. 1 also needs to meet merely a lower withstand voltage requisite as compared with the one in the circuits of FIGS. 6 and 7, whereby the parallel resonance capacitor Cr can be down-sized as well.

For reference, the following are the actual values of the component elements selected in the power circuit of FIG. 1 in obtaining the experimental results shown in FIGS. 2A through 2P.

Parallel resonance capacitor Cr=6800 pF
Clamp capacitor CCL=0.22 µF
Primary winding N1=35 T
(In the circuit of FIGS. 6 and 7, N1=approx. 45 T)

FIGS. 3A through 3D show some waveforms of operations in the essential components upon occurrence of a load shorted fault in the power circuit of FIG. 1.

As obvious from the description given above, in this embodiment, the on/off duty ratio is changed under control while the switching frequency fs is kept constant. That is, none of voltage regulation is executed for stabilizing the voltage by controlling the switching frequency.

Figures 3A, 3B, 3C, 3D:
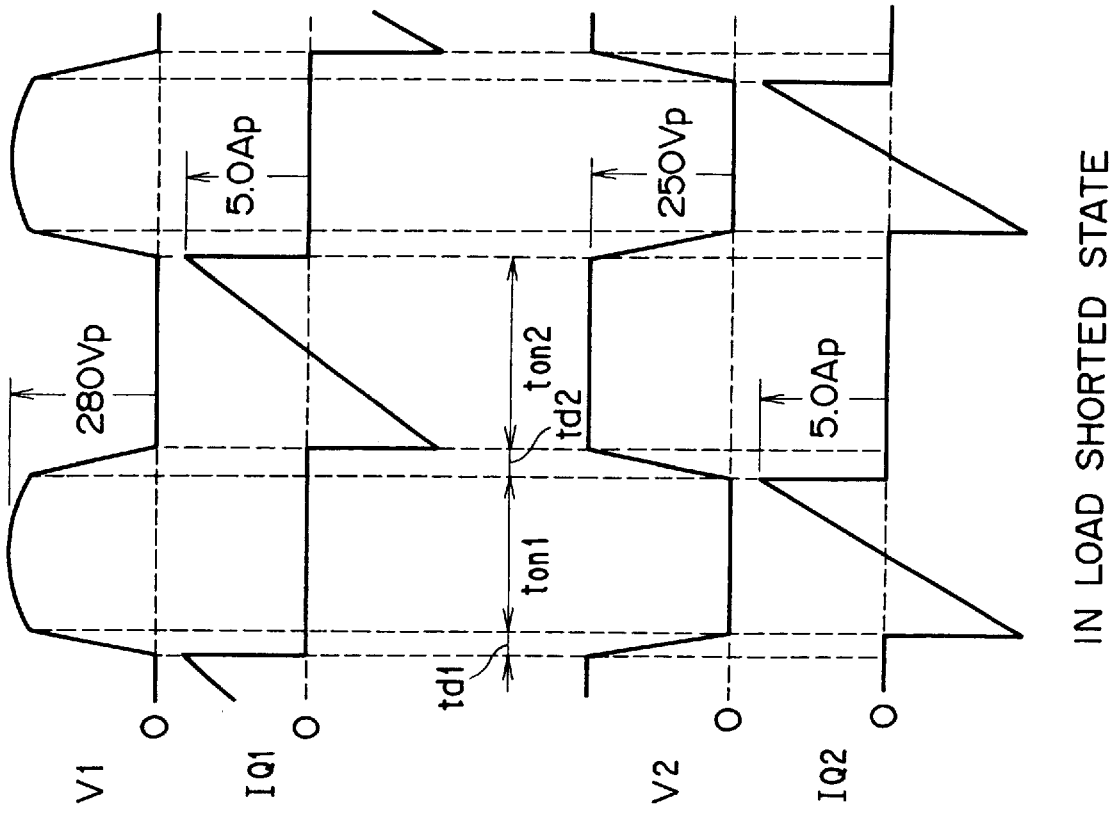
FIGS. 3A through 3D show waveform charts of operations performed in a load shorted state in the embodiment of the switching power circuit.

Upon occurrence of a load shorted state in this embodiment, as seen from the parallel resonance voltage V1 and the switching output current IQ1 of FIGS. 3A and 3B, the on/off duty ratio of the main switching element Q1 is controlled to be approximately 50%. And simultaneously therewith, as shown in FIGS. 3C and 3D, the on/off duty ratio of the auxiliary switching element Q2 is also controlled to be approximately 50%. Consequently, even in such a load shorted state caused in this embodiment, the same ZVS and ZCS as those explained already with reference to FIGS. 2A through 2P are executed stably to thereby achieve desired suppression as parallel resonance voltage V1=280 Vp, switching output current IQ1=5.0 Ap, switching output voltage V2=250 Vp, and clamp current IQ2=5.0 Ap. Thus, there exists no necessity of preparing an overcurrent protection circuit and an overvoltage protection circuit against a load shorted fault for example.

Figure 4:
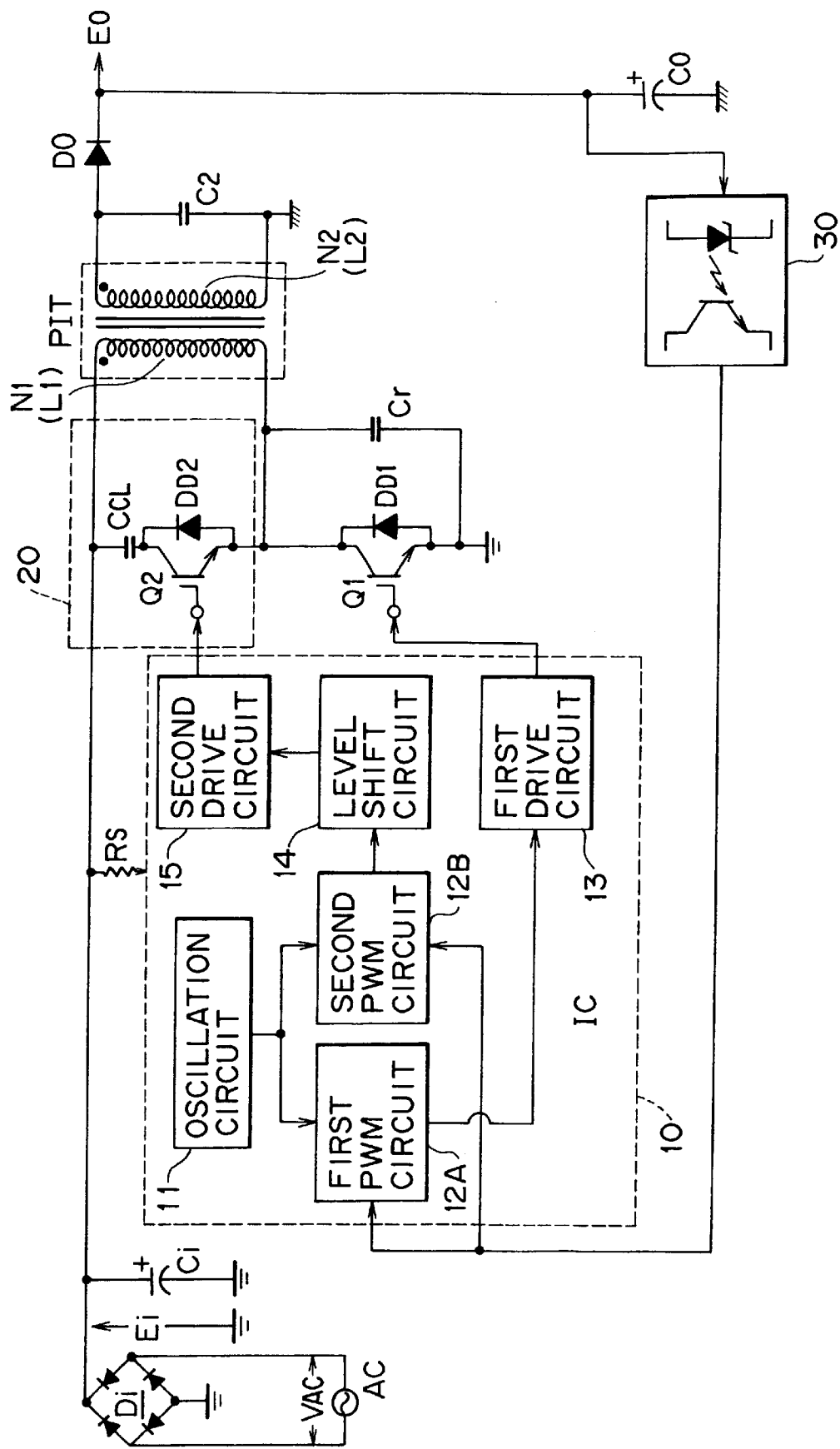
FIG. 4 is a circuit diagram showing an exemplary configuration of another embodiment which represents the switching power circuit of the invention.

FIG. 4 shows another preferred embodiment representing the switching power circuit of the present invention. In this diagram, any component parts corresponding to those in FIG. 1 are denoted by the same reference numerals or symbols, and a repeated explanation thereof is omitted here.

In the power circuit of this diagram, the difference from the aforementioned circuit of FIG. 1 resides in that an IGBT (Insulated Gate Bipolar Transistor) is employed as each of a main switching element Q1 and an auxiliary switching element Q2. And even in such a circuit configuration, the same operation can be performed as that explained above with reference to FIGS. 2A through 2P and FIGS. 3A through 3D.

For example, in the circuit of FIG. 4, it is possible to select an IGBT of a low withstand voltage as a switching element. And the switching characteristics of such an IGBT realize some reduction of its saturation voltage or tail current at the turn-off time. Thus, the power loss can be diminished by improvements of such characteristics.

On the secondary side of the power circuit shown in this diagram, a half-wave rectifier circuit is formed by connecting a combination of a rectifier diode DO1 and a smoothing capacitor CO to a secondary winding N2, and a secondary DC output voltage EO is obtained by the half-wave rectifier circuit.

Figure 5:
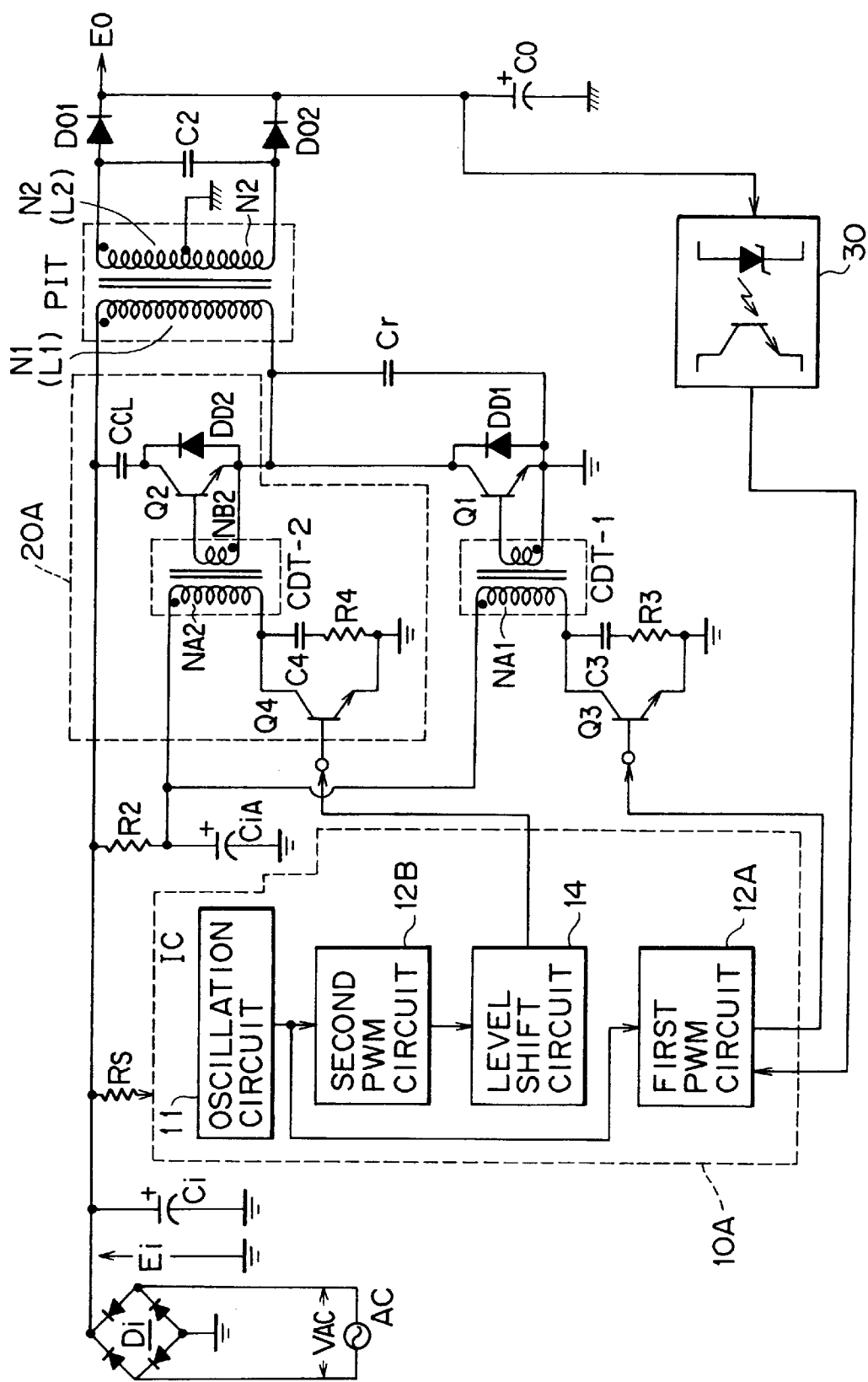
FIG. 5 is a circuit diagram showing an exemplary configuration of a further embodiment which represents the switching power circuit of the invention.

FIG. 5 shows a further preferred embodiment representing the switching power circuit of the present invention. In the power circuit of this diagram, a BJT (Bipolar Transistor) is employed as each of a main switching element Q1 and an auxiliary switching element Q2. In this circuit configuration, the main switching element Q1 and the auxiliary switching element Q2 are driven separately.

In this case, a switching driver 10A is so formed that an oscillation signal outputted from an oscillation circuit 11 is branched and supplied to both a first PWM control circuit 12A and a second PWM control circuit 12B. The switching driver 10A shown in this diagram is composed of a single IC.

In the first PWM control circuit 12A, PWM control is executed for the oscillation signal in accordance with any variation of a secondary DC output voltage EO to thereby obtain a signal of the waveform that corresponds to the on/off timing of the gate voltage VG1 shown in FIGS. 2A through 2P.

In a circuit line consisting of the second PWM control circuit 12B to a level shift circuit 14, PWM control is executed for the oscillation signal in accordance with any variation of the secondary DC output voltage EO, and then a required level shift is executed for the oscillation signal to thereby obtain a signal of the waveform that corresponds to the on/off timing of the gate voltage VG2 shown in FIGS. 2A through 2P.

The output of the first PWM control circuit 12A is supplied to the base of a switching element Q3, while the output of the level shift circuit 14 is supplied to the base of a switching element Q4.

For the purpose of driving the BJT separately in this case, the front stage of main switching elements (Q1, Q2) is equipped with a drive circuit which consists of drive switching elements (Q3, Q4) and converter drive transformers (CDT-1, CDT-2) for transmitting the outputs of the drive switching elements to the main switching elements (Q1, Q2).

First in the drive circuit provided on the side of the main switching element Q1, a collector of the drive switching element Q3 is connected to the end of a primary winding N1A of the converter drive transformer CDT-1, while an emitter thereof is connected to a primary ground. And a series connection circuit consisting of a capacitor C3 and a resistor R3 is inserted in parallel between the collector and emitter of the drive switching element Q3 to absorb the noise.

In the converter drive transformer CDT-1, a primary winding N1A is coiled on the primary side, and a drive winding NB1 is coiled on the secondary side. These primary winding N1A and the drive winding NB1 are coiled in different directions to generate voltages of mutually reverse polarities. The end of the primary winding N1A is connected to the drive switching element Q3 as described, while the beginning thereof is connected to a positive terminal of a capacitor CiA.

The capacitor CiA is connected to the line of a rectified smoothed voltage Ei via a resistor R2, so that a DC voltage of a predetermined level is obtained across the capacitor CiA by lowering the rectified smoothed voltage Ei through the resistor R2. This DC voltage is used as an operating power for the drive switching element Q3 and the drive switching element Q4 which will be described later.

In the converter drive transformer CDT-1, the end of the drive winding NB1 is connected to the base of the main switching element Q1, while the beginning thereof is connected to the primary ground.

When a current outputted as a drive signal from the first PWM circuit 12A is supplied to the base of the drive switching element Q3, the drive switching element Q3 performs a switching operation in response to this drive signal, and then transmits the switching output to the primary winding N1A of the converter drive transformer CDT-1. Consequently, an alternating voltage is obtained in the primary winding N1A, and an alternating voltage is induced in the drive winding NB1. Subsequently an alternating current generated by the alternating voltage induced in the drive winding NB1 is supplied as a drive current to the base of the main switching element Q1, which is thereby driven to perform its switching operation. The main switching element Q1 performs a voltage resonant switching operation due to the resonance action of a parallel resonance circuit which consists of a parallel resonance capacitor Cr connected between the collector and emitter of the switching element Q1 and a primary winding N1 of an insulating converter transformer PIT.

The drive circuit provided on the side of the auxiliary switching element Q2 comprises a drive switching element Q4, a capacitor C4 and a resistor R4 as peripheral elements thereof, and a converter drive transformer CDT-2 having a primary winding NA2 and a drive winding NB2. Since the connection of such components is the same as in the drive circuit provided on the side of the main switching element Q1, a repeated explanation thereof is omitted here.

On the side of the auxiliary switching element Q2, the drive switching element Q4 is driven to perform a switching operation by a drive current outputted from the level shift circuit 14, and then the switching output is transmitted to the auxiliary switching element Q2 via the converter drive transformer CDT-2, so that the auxiliary switching element Q2 performs its switching operation.

As the main switching element Q1 and the auxiliary switching element Q2 are thus driven for switching, the same operation is achievable as that mentioned with reference to FIGS. 2A through 2P and FIGS. 3A through 3D.

In the circuit of FIG. 5 where a BJT of a low withstand voltage can be selectively employed as each of the switching elements, the switching characteristic of such a BJT is effective to reduce the storage time and the fall time to consequently enhance the power conversion efficiency.

It is to be understood that the present invention is not limited to any of the exemplary configurations shown in the drawings as preferred embodiments. For example, a SIT (Static Induction Thyristor) or some other element may be employed as the main or auxiliary switching element. Also the structure of the switching driver for external excitation need not be limited to any of the examples shown in the drawings, and may be modified to some other adequate circuit configuration.

Further, the secondary rectifier circuit including the secondary parallel resonance circuit is not limited to any of the examples shown in the drawings as preferred embodiments, and some other adequate circuit configuration may be employed as well.

In the switching power circuit of the present invention, as described hereinabove, an active clamp circuit is provided on the primary side of a composite resonance type switching converter which has a voltage resonant converter on its primary side and a parallel resonance circuit on its secondary side, wherein a parallel resonance voltage pulse generated across a primary parallel resonance capacitor is clamped so that the level thereof is suppressed. Consequently, the withstand voltage requisite relative to any of the component elements such as switching elements and the primary parallel resonance capacitor employed in the power circuit can be selectively lowered.

Thus, the switching characteristics of the switching elements can be improved due to selection of lower withstand voltage requisites, hence achieving enhancement of the power conversion efficiency as well.

And further due to selection of lower withstand voltage requisites, the component elements can be down-sized to eventually realize more dimensional and weight reduction of the substrate that constitutes the power circuit.

Besides the above, according to the switching drive configuration of the present invention, the switching frequency is kept fixed without being lowered upon occurrence of a load shorted state for example, differently from the conventional case of executing constant voltage control by changing the switching frequency, so that both the main and auxiliary switching elements are enabled to perform switching operations by stabilized ZVS and ZCS. Consequently, it becomes possible to eliminate the necessity of preparing an overvoltage protection circuit or an overcurrent protection circuit against a load shorted fault, hence attaining wide advancement in dimensional and weight reduction of the circuit.

Moreover, the active clamp circuit in the present invention can be formed by connecting, e.g., an auxiliary switching element, a clamp capacitor and a clamp diode in parallel to the primary winding of an insulating converter transformer, whereby the number of required component parts to be added is minimized to consequently cause no impediment to the desired dimensional and weight reduction of the circuit.

While a preferred embodiment of the present invention has been described using specific terms, such description is for illustrative purposes only, and it is to be understood that changes and variations may be made without departing from the spirit or scope of the following claims.

What is claimed is:

1. A switching power circuit comprising:

switching means having a main switching element for intermittently outputting a DC input voltage supplied thereto;

a primary parallel resonance capacitor so provided as to constitute a primary parallel resonance circuit which turns the operation of said switching means into a voltage resonance type;

an insulating converter transformer where a gap is formed in such a manner as to obtain a required coupling coefficient to acquire coarse coupling with regard to the primary and secondary sides, and the output of said switching means obtained on the primary side is transmitted to the secondary side;

a secondary parallel resonance circuit formed by connecting a secondary parallel resonance capacitor in parallel to a secondary winding of said insulating converter transformer;

DC output voltage generating means so formed as to generate a secondary DC output voltage by inputting and rectifying an alternating voltage obtained from the secondary winding of said insulating converter transformer;

switching drive means for driving said main switching means to execute constant voltage control thereof by changing the on/off duty ratio in each switching period at a predetermined constant switching frequency in accordance with the level of the secondary DC output voltage; and active clamp means having an auxiliary switching element to perform a switching operation in such a manner as to obtain predetermined on/off times changeable in accordance with the on/off times of said main switching element, thereby clamping the primary parallel resonance voltage generated across said primary parallel resonance capacitor during the off-time of said main switching element.

2. A switching power circuit according to claim 1, wherein said active clamp means is so formed that a series connection circuit consisting of said auxiliary switching element and a clamp capacitor is connected in parallel to the primary winding of said insulating converter transformer, and a diode element is connected in parallel to said auxiliary switching element.

* * * * *

UNITED STATES PATENT AND TRADEMARK OFFICE
CERTIFICATE OF CORRECTION

| | |
|---|---|
| PATENT NO. | : 6,320,765 B1 |
| DATED | : November 20, 2001 |
| INVENTOR(S) | : Yasumura |

It is certified that error appears in the above-identified patent and that said Letters Patent is hereby corrected as shown below:

<u>Title page,</u>

Item [30], Foreign Application Priority Data,

Feb. 9, 2000  (JP) ..............................2000-38060

Signed and Sealed this

Twelfth Day of March, 2002

*Attest:*

*Attesting Officer*

JAMES E. ROGAN
*Director of the United States Patent and Trademark Office*